(12) United States Patent
Zhu et al.

(10) Patent No.: US 10,051,454 B2
(45) Date of Patent: Aug. 14, 2018

(54) TERMINAL-TO-TERMINAL COMMUNICATION (71) Applicant: FUJITSU LIMITED, Kawasaki-shi, Kanagawa (JP)

(72) Inventors: Chenxi Zhu, Fairfax, VA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/908,858

(22) PCT Filed: Jan. 7, 2014

(86) PCT No.: PCT/US2014/010529
§ 371 (c)(1),
(2) Date: Jan. 29, 2016

(87) PCT Pub. No.: WO2015/016962
PCT Pub. Date: Feb. 5, 2015

(65) Prior Publication Data
US 2016/0183251 A1   Jun. 23, 2016

Related U.S. Application Data (60) Provisional application No. 61/861,402, filed on Aug. 1, 2013.

(51) Int. Cl.
*H04W 72/04* (2009.01)
*H04W 8/00* (2009.01)
(Continued)

(52) U.S. Cl.
CPC .......... *H04W 8/005* (2013.01); *H04B 7/0456* (2013.01); *H04B 7/0617* (2013.01); *H04B 7/0639* (2013.01); *H04W 4/70* (2018.02); *H04W 8/186* (2013.01); *H04W 24/02* (2013.01); *H04W 28/04* (2013.01); *H04W 52/241* (2013.01); *H04W 52/242* (2013.01); *H04W 52/243* (2013.01); *H04W 56/001* (2013.01); *H04W 72/042* (2013.01); *H04W 72/0406* (2013.01);
(Continued)

(58) Field of Classification Search
CPC .................................................. H04W 72/0446
See application file for complete search history.

(56) References Cited

U.S. PATENT DOCUMENTS 5,850,592 A   12/1998  Ramanathan
6,493,759 B1  12/2002  Passman et al.
(Continued)

OTHER PUBLICATIONS

U.S. Office Action issued in corresponding U.S. Appl. No. 14/909,082, dated Apr. 28, 2017.
(Continued)

*Primary Examiner* — John Blanton
(74) *Attorney, Agent, or Firm* — Maschoff Brennan (57) ABSTRACT A method of enabling terminal-to-terminal communication includes organizing a cluster including a cluster head, a first cluster member, and a second cluster member. The first cluster member includes a first terminal. The second cluster member includes a second terminal. The cluster head is connected to the first cluster member and the second cluster member. The method further includes controlling a unicast communication from the first cluster member to the second cluster member via the cluster head.

20 Claims, 5 Drawing Sheets (51) Int. Cl.
*H04B 7/0456* (2017.01)
*H04B 7/06* (2006.01)
*H04W 24/02* (2009.01)
*H04W 74/00* (2009.01)
*H04W 52/24* (2009.01)
*H04W 8/18* (2009.01)
*H04W 56/00* (2009.01)
*H04W 72/10* (2009.01)
*H04W 28/04* (2009.01)
*H04W 4/70* (2018.01)
*H04W 76/14* (2018.01)

(52) U.S. Cl.
CPC ... *H04W 72/0413* (2013.01); *H04W 72/0446* (2013.01); *H04W 72/0473* (2013.01); *H04W 72/10* (2013.01); *H04W 74/006* (2013.01); *H04W 76/14* (2018.02)

(56) References Cited

U.S. PATENT DOCUMENTS

| | | |
|---|---|---|
| 6,711,409 B1 | 3/2004 | Zavgren, Jr. et al. |
| 7,978,631 B1 | 7/2011 | Abdelaziz et al. |
| 8,355,736 B2 | 1/2013 | Mitra et al. |
| 2006/0045130 A1 | 3/2006 | Kim et al. |
| 2007/0010270 A1 | 1/2007 | Dillon |
| 2007/0165569 A1 | 7/2007 | Kaminski |
| 2007/0254643 A1 | 11/2007 | Garcia et al. |
| 2008/0253327 A1 | 10/2008 | Kohvakka et al. |
| 2009/0034432 A1 | 2/2009 | Bonta et al. |
| 2009/0045975 A1 | 2/2009 | Evans et al. |
| 2010/0075689 A1 | 3/2010 | Uemura et al. |
| 2010/0093364 A1 | 4/2010 | Ribeiro |
| 2010/0148940 A1 | 6/2010 | Gelvin et al. |
| 2010/0291962 A1 | 11/2010 | Kim et al. |
| 2010/0303034 A1 | 12/2010 | Chen et al. |
| 2011/0032909 A1 | 2/2011 | Park et al. |
| 2011/0151887 A1 | 6/2011 | Hakola |
| 2011/0319097 A1 | 12/2011 | Wirola |
| 2012/0021704 A1 | 1/2012 | Chan et al. |
| 2012/0129540 A1* | 5/2012 | Hakola ............... H04W 72/042 455/450 |
| 2012/0236909 A1 | 9/2012 | Ma et al. |
| 2012/0282859 A1 | 11/2012 | Mayer et al. |
| 2013/0138792 A1 | 5/2013 | Preden et al. |
| 2013/0308714 A1 | 11/2013 | Xu et al. |
| 2013/0308715 A1 | 11/2013 | Nam et al. |
| 2014/0098759 A1* | 4/2014 | Noh ................... H04W 72/082 370/329 |
| 2014/0098761 A1 | 4/2014 | Lee et al. |
| 2014/0177683 A1 | 6/2014 | Krishnamurthy et al. |
| 2014/0328329 A1* | 11/2014 | Novlan ............... H04W 72/042 370/336 |
| 2014/0376458 A1* | 12/2014 | Ryu ................... H04W 72/085 370/329 |
| 2015/0016312 A1 | 1/2015 | Li et al. |
| 2015/0173105 A1 | 6/2015 | Bergstrom et al. |
| 2015/0223279 A1 | 8/2015 | Jiao et al. |
| 2015/0257173 A1 | 9/2015 | You et al. |
| 2015/0296518 A1 | 10/2015 | Yi et al. |
| 2015/0359004 A1 | 12/2015 | Xu et al. |
| 2016/0142981 A1 | 5/2016 | Yi et al. |
| 2016/0150570 A1 | 5/2016 | Wang et al. |

OTHER PUBLICATIONS

U.S. Office Action issued in corresponding U.S. Appl. No. 14/909,080, dated Jun. 22, 2017.
Advisory Action issued for related U.S. Appl. No. 14/909,082, dated Aug. 10, 2017.
U.S. Office Action issued in corresponding U.S. Appl. No. 14/908,980, dated Aug. 11, 2017.
U.S. Office Action issued in corresponding U.S. Appl. No. 14/909,077, dated May 22, 2017.
U.S. Office Action issued in corresponding U.S. Appl. No. 14/909,082, dated Nov. 10, 2016.
U.S. Office Action dated Jan. 23, 2018 in U.S. Appl. No. 14/908,974.
U.S. Office Action issued in U.S. Appl. No. 14/908,974, dated Sep. 6, 2017.
U.S. Office Action issued in U.S. Appl. No. 14/909,082, dated Sep. 15, 2017.
Advisory Action dated Apr. 26, 2018 in U.S. Appl. No. 14/908,974.
Office Action dated Apr. 23, 2018 in U.S. Appl. No. 14/909,080.

* cited by examiner

TERMINAL-TO-TERMINAL COMMUNICATION

FIELD

The embodiments discussed herein are related to terminal-to-terminal communication.

BACKGROUND

Terminal-to-terminal communication may allow data transmissions to be made directly between two or more terminals of a telecommunication system. The terminal-to-terminal communication may overlay regular cellular communications, and may be performed with or without cellular network coverage.

In some instances, using terminal-to-terminal communication may increase network capacity. For example, terminal-to-terminal communication may permit spatial multiplexing, which may allow for higher relative spectrum usage. Employing terminal-to-terminal communication may also permit throughput between terminals to be increased if a terminal-to-terminal link experiences better channel quality than a cellular link. Using terminal-to-terminal communication may reduce resource usage when data is transmitted once between two terminals during a terminal-to-terminal transmission, as compared to transmitting the same data twice between the two terminals over a cellular link, i.e., once through an uplink (UL) transmission from a transmitting terminal to a base station and once through a downlink (DL) transmission to a receiving terminal from the base station.

Terminal-to-terminal communication may reduce communication latency of a telecommunication network. For example, terminal-to-terminal communication may not relay data through a base station and/or a core network, thus potentially reducing the transit time of the data and/or the load on the base station and/or the core network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of enabling terminal-to-terminal communication includes organizing a cluster including a cluster head, a first cluster member, and a second cluster member. The first cluster member includes a first terminal.

The second cluster member includes a second terminal. The cluster head is connected to the first cluster member and the second cluster member. The method further includes controlling a unicast communication from the first cluster member to the second cluster member via the cluster head.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may also be applicable to other telecommunication systems.

Some embodiments may relate to performing and/or enabling terminal-to-terminal communication in a telecommunication system. The terminal-to-terminal communication may occur with or without cellular network coverage.

Embodiments of the present invention will be explained with reference to the accompanying drawings.

Figure 1:
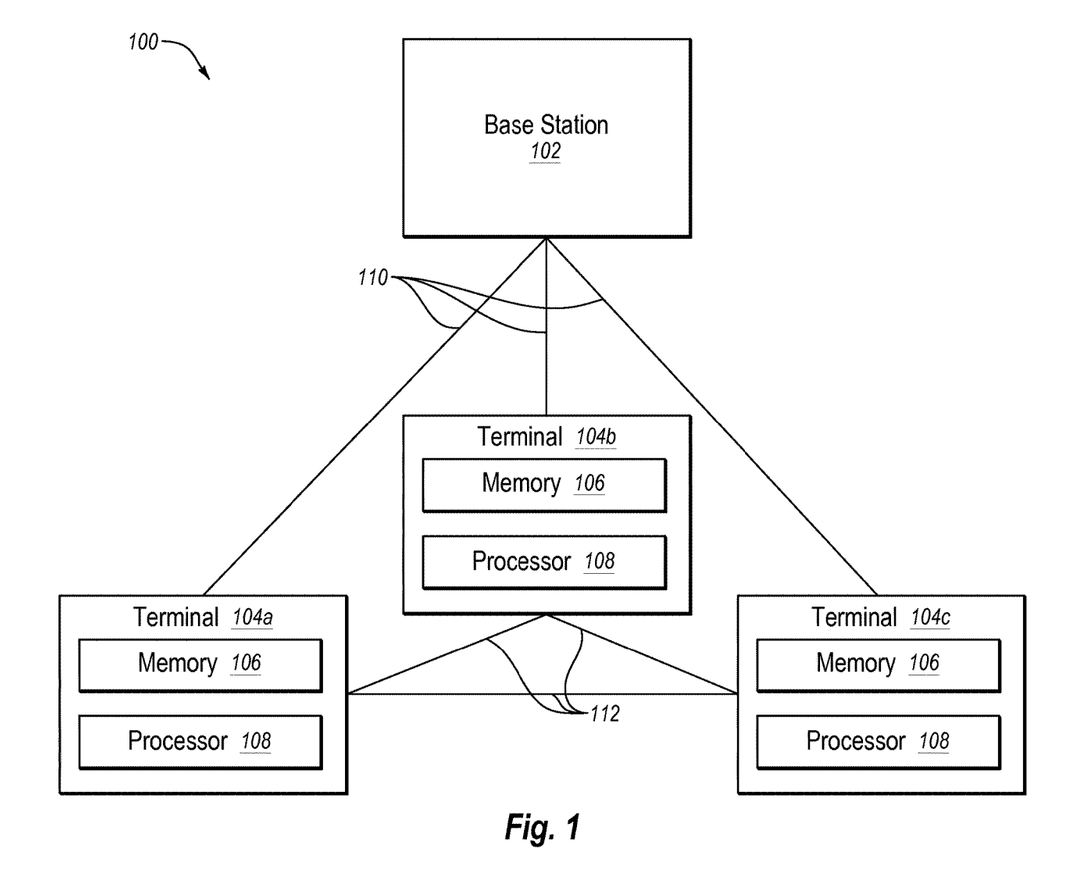
FIG. 1 is a diagrammatic view of an example telecommunication system.

FIG. 1 is a diagrammatic view of an example telecommunication system 100, arranged in accordance with at least one embodiment described herein. In some embodiments, a network architecture of the telecommunication system 100 may include the network architecture of an Evolved Universal Mobile Telecommunications System (E-UMTS). The E-UMTS may include an LTE radio access network, for instance. The radio access network may include an E-UMTS Terrestrial Radio Access Network (E-UTRAN). However, other types of network architecture may alternately or additionally be used.

The telecommunication system 100 may include a base station 102. The base station 102 may include base station equipment, including hardware and/or software for radio communication with radio-communication-equipped nodes ("wireless nodes"). For example, the base station 102 may be equipped for radio communication 110 with wireless nodes such as terminal 104a, terminal 104b, and terminal 104c (collectively "terminals 104"). The base station 102 may generally allow the wireless nodes, including the terminals 104, to wirelessly communicate with each other and/or to wirelessly access a network (not shown) via radio communication 110 with the base station 102.

The base station 102 may include hardware and software for radio communication over a licensed spectrum. The licensed spectrum may generally include portions of a radio spectrum licensed for transmission of wireless data, such as cellular data. For example, the base station 102 may be configured to transmit cellular data that complies with an LTE radio access network, such as an LTE radio access network according to 3GPP LTE specification releases 8-12.

The base station 102 may include an E-UTRAN NodeB (eNB) associated with LTE radio access networks.

The terminals 104 may include equipment configured to allow the terminals 104 to transmit and receive data via wireless communications via the licensed spectrum. For example, the terminals 104 may include hardware, such as one or more antennas for transmitting and receiving radio transmissions, and codecs. The terminals 104 may include mobile phones, tablet computers, laptop computers, and/or other electronic devices that may use radio communication. Alternately or additionally, the terminals 104 may include devices that employ machine-type communication (MTC). The terminals 104 may include user equipment (UE) associated with LTE radio access networks.

Each of the terminals 104 may include memory 106 and a processor 108. The memory 106 may include a non-transitory computer-readable medium. Instructions such as programming code executable by the processor 108 may be encoded in the memory 106. When the instructions are executed by the processor 108, the associated terminals 104a, 104b, and 104c may perform operations related to and/or including the processes described herein.

The terminals 104 may be equipped for terminal-to-terminal communication 112, which may include device-to-device (D2D) communication associated with LTE radio access networks. The terminal-to-terminal communication 112 may allow the terminals 104 to transmit and/or receive data among the terminals 104 without routing the data through the base station 102.

Figure 2:
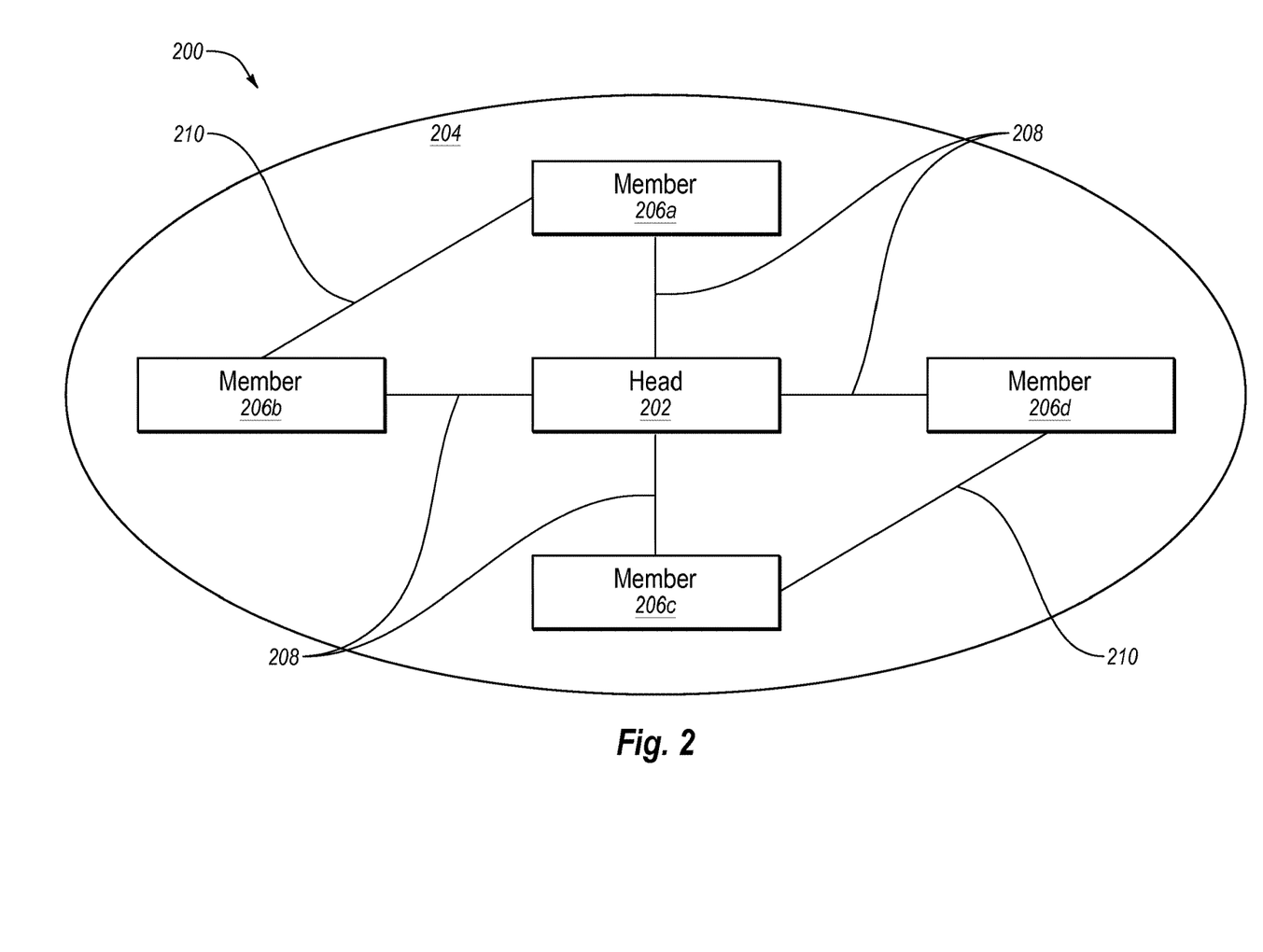
FIG. 2 is a diagrammatic view of an example cluster that may be implemented in the telecommunication system of FIG. 1.

FIG. 2 is a diagrammatic view of an example cluster 200. In some embodiments, the cluster 200 may be implemented in the telecommunication system 100 of FIG. 1. The cluster 200 may include a cluster head 202. The cluster 200 may also include a cluster member 206a, a cluster member 206b, a cluster member 206c, and a cluster member 206d (collectively "cluster members 206"). The cluster members 206 may be terminals generally corresponding to the terminals 104 of FIG. 1. The cluster members 206 may be within a transmission range 204 of the cluster head 202. The cluster members 206 may be communicatively associated with the cluster head 202, described herein as being connected to the cluster head 202. The cluster members 206 may or may not be within a transmission range (not shown) of each of the other cluster members 206. The cluster 200 may enable cluster-member-to-cluster-member communication 210. The cluster-member-to-cluster-member communication 210 may generally correspond to the terminal-to-terminal communication 112 of FIG. 1.

In some embodiments, the cluster head 202 may be a base station generally corresponding to the base station 102 of FIG. 1. For example, a base station may be the cluster head 202 for cluster members 206 located within a cell generally corresponding to the transmission range 204 of the base station. In embodiments including a base station as the cluster head 202, a cluster-member-to-cluster-head communication 208 may generally correspond to the radio communication 110 of FIG. 1. In some embodiments, when the cluster head 202 is a base station, one or more terminals connected to the base station for cellular communication may be cluster members 206.

Alternately, the cluster head 202 may be a terminal generally corresponding to the terminals 104 of FIG. 1. For example, a terminal may be the cluster head 202 for cluster members 206 located within a transmission range 204 of the cluster head 202. The cluster head 202 and/or one or more of the cluster members 206 may be outside of cellular network coverage, e.g., the cluster head 202 and/or one or more of the cluster members 206 may be outside of a transmission range of a base station. In embodiments including a terminal as the cluster head 202, the cluster-member-to-cluster-head communication 208 may generally correspond to the terminal-to-terminal communication 112 of FIG. 1.

In some embodiments, one or more of the cluster members 206 may be identified via a cluster member identification. The cluster head 202 may assign the cluster member identification. If the cluster head 202 is a base station, the cluster member identification may include a cell radio-network temporary identifier (C-RNTI) associated with LTE radio access networks. If the cluster head 202 is a terminal, the cluster member identification may include a D2D radio-network temporary identifier (D2D-RNTI).

Connectivity between the cluster head 202 and the cluster members 206, and/or connectivity among the cluster members 206 may depend on a transmission power of the cluster head 202. In some embodiments, the transmission power of the cluster head 202 may be adjusted based on a number of terminals within the transmission range 204 of the cluster head 202. The transmission power of the cluster head 202 may be reduced to reduce the size of the transmission range 204 and potentially reduce the number of cluster members 206 in the cluster 200. Alternately, the transmission power of the cluster head 202 may be increased to increase the size of the transmission range 204 and potentially increase the number of cluster members 206 in the cluster 200.

The cluster members 206 may set a default transmission power associated with the cluster 200. The default transmission power of each of the cluster members 206 may be based on an estimated path loss between each of the cluster members 206 and the cluster head 202. The estimated path loss between each of the cluster members 206 and the cluster head 202 may be based on a cluster beacon transmitted by the cluster head 202. The cluster beacon may advertise the existence of the cluster 200 and may be used for synchronization by the cluster members 206. In some embodiments, a link budget between each of the cluster members 206 and the cluster head 202 may be roughly symmetric.

Alternately or additionally, the default transmission power of each of the cluster members 206 associated with the cluster 200 may be based on power control commands transmitted by the cluster head 202. For example, with respect to the cluster member 206a, the cluster head 202 may monitor a signal received from the cluster member 206a and may transmit a power control command to the cluster member 206a based on the signal received from the cluster member 206a.

The default transmission powers of each of the cluster members 206 in the cluster 200 may be different. The cluster members 206 may perform cluster-member-to-cluster-member communication 210 directly between two or more cluster members 206. The cluster-member-to-cluster-member communication 210 may generally correspond to the terminal-to-terminal communication 112 of FIG. 1.

In some embodiments, the cluster head 202 may manage the cluster-member-to-cluster-member communication 210 within the cluster 200. The high received power threshold and/or the low received power threshold may be configured by the cluster head 202 through the RRC. For example, the cluster head 202 may set a high received power threshold and/or a low received power threshold for a particular cluster-member-to-cluster-member communication 210. Alternately, the cluster head 202 may set the high received power threshold and/or the low received power threshold for all or a subset of all the cluster-member-to-cluster-member communication 210 in the cluster 200.

The high received power threshold may be represented by the symbol $Th^H$. The high received power threshold may represent a power above which a cluster-member-to-cluster-member communication 210 may be successfully received by the cluster members 206 in a bidirectional link. By way of example, a bidirectional link between the cluster member 206a and the cluster member 206b may allow cluster-member-to-cluster-member communication 210 between the cluster member 206a and the cluster member 206b. Both the cluster member 206a and the cluster member 206b may successfully receive the cluster-member-to-cluster-member communication 210 if the cluster-member-to-cluster-member communication 210 is received with a power equal to or above the high received power threshold.

The low received power threshold may be represented by the symbol $Th^L$. The low received power threshold may represent a power below which an attempted cluster-member-to-cluster-member communication 210 may be unsuccessfully received and/or not received by the cluster members 206 in an interference link. By way of example, an interference link between the cluster member 206a and the cluster member 206b may not allow cluster-member-to-cluster-member communication 210 between the cluster member 206a and the cluster member 206b. In some embodiments, an interference link may not be used in cluster-member-to-cluster-member communication 210.

A path loss between two of the cluster members 206 may be represented by a symbol PL. By way of example, a path loss between the cluster member 206a and the cluster member 206b may be represented by the symbol $PL_{a-b}$.

A default transmission power associated with the cluster 200 by the cluster member 206a may be represented by a symbol $P^D_a$ and a default transmission power associated with the cluster 200 by the cluster member 206b may be represented by a symbol $P^D_b$.

A cluster-member-to-cluster-member communication 210 transmitted by the cluster member 206b at the cluster member 206b default transmission power may be received at the cluster member 206a at a received power represented by $PL_{a-b} \cdot P^D_b$. Conversely, the power of a cluster-member-to-cluster-member communication 210 received at the cluster member 206b when transmitted from the cluster member 206a at the cluster member 206a default power may be represented by $PL_{a-b} \cdot P^D_a$.

The cluster member 206a and the cluster member 206b may have a bidirectional link as a result of the cluster-member-to-cluster-member communication 210 being received at both the cluster member 206a and the cluster member 206b with received power equal to or greater than the high received power threshold. Put another way, the cluster member 206a and the cluster member 206b may have a bidirectional link at the default transmission powers of the cluster member 206a and the cluster member 206b when the following formula 1 and formula 2 are both true.

$$PL_{a-b} \cdot P^D_b \geq Th^H \quad \text{Formula 1:}$$

$$PL_{a-b} \cdot P^D_a \geq Th^H \quad \text{Formula 2:}$$

In some embodiments, if one or both of formula 1 and formula 2 are not true, the transmission power of the cluster member 206a may be increased and/or the transmission power of the cluster member 206b may be increased such that the cluster-member-to-cluster-member communication 210 is received at the cluster member 206a and at the cluster member 206b with a received power equal to or greater than the high received power threshold. Put another way, the cluster members 206 may change the transmission power of the cluster-member-to-cluster-member communication 210 to form bidirectional links.

The cluster members 206 may exchange cluster-member-to-cluster-member communication 210 over the bidirectional links.

The cluster member 206a and the cluster member 206b may have a unidirectional link as a result of the power of the cluster-member-to-cluster-member communication 210 being received at only one of the cluster member 206a and the cluster member 206b with a received power greater than or equal to the high received power threshold. In some embodiments, a unidirectional link may be used for one-way cluster-member-to-cluster-member communication 210. In these and other embodiments, one or more of the cluster members 206 may change the transmission power of the cluster-member-to-cluster-member communication 210 to turn the unidirectional links into bidirectional links.

The cluster member 206a and the cluster member 206b may have an interference link as a result of the power of the cluster-member-to-cluster-member communication 210 being received at both the cluster member 206a and the cluster member 206b with a received power less than or equal to the low received power threshold. In some embodiments, the interference links may not be used by the cluster members 206 for cluster-member-to-cluster-member communication 210. Alternately or additionally, the cluster members 206 may change the transmission power of the cluster-member-to-cluster-member communication 210 to turn the interference links into unidirectional links and/or bidirectional links.

Figure 3:
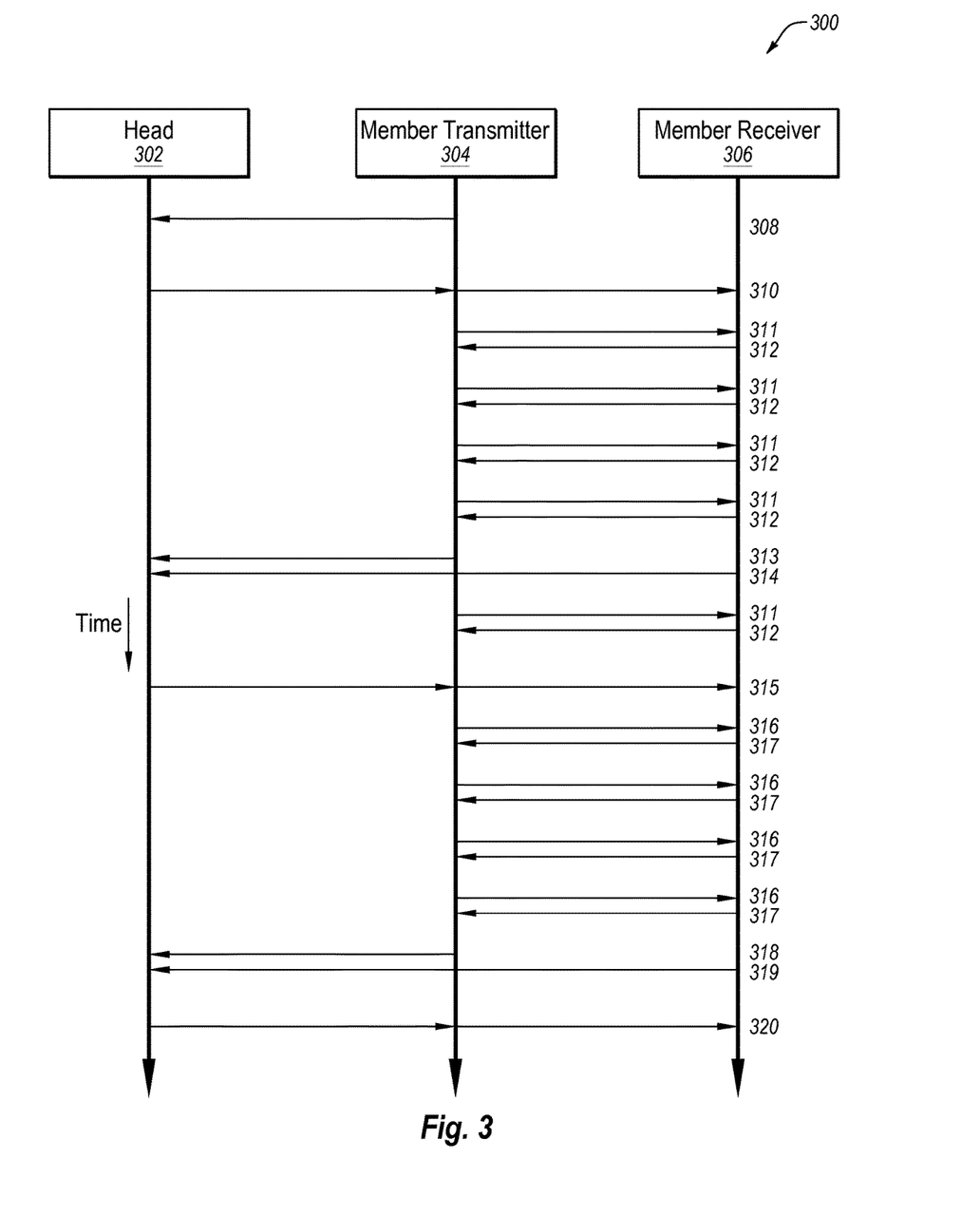
FIG. 3 is a diagrammatic view of an example communication process between a cluster head, a cluster member transmitter, and a cluster member receiver that may be implemented in the cluster of FIG. 2.

FIG. 3 is a diagrammatic view of an example communication process 300 between a cluster head 302, a cluster member transmitter 304, and a cluster member receiver 306 that may be implemented in the cluster 200 of FIG. 2. The cluster head 302 may generally correspond to the cluster head 202 of FIG. 2. The cluster member transmitter 304 and the cluster member receiver 306 may generally correspond, respectively, to the cluster member 206a and the cluster member 206b.

In some embodiments, the terminal-to-terminal communication may be performed as one or more unicast sessions. For example, the communication process 300 may represent a one-way data transmission from the cluster member transmitter 304 to the cluster member receiver 306. In some embodiments, a communication process (not shown) similar to the communication process 300 may be performed to transmit data from the cluster member receiver 306 to the cluster member transmitter 304 by reversing the roles of the cluster member transmitter 304 and cluster member receiver 306.

In some embodiments, the cluster head 302 may allocate resources for the unicast session in a manner similar to or the same as semi-persistent scheduling (SPS) associated with LTE radio access networks. Performing a terminal-to-terminal communication as one or more unicast sessions and/or in a manner similar to or the same as SPS may promote an efficient use of resources and/or an efficient use of power at the cluster head 302. Other scheduling schemes, e.g., dynamic scheduling associated with LTE radio access networks, may alternately or additionally be used.

The communication process 300 may begin with the cluster member transmitter 304 transmitting a request for resources 308. The resources may be requested for a terminal-to-terminal communication generally corresponding to the cluster-member-to-cluster-member communication 210 of FIG. 2 to be performed as a unicast session between the cluster member transmitter 304 and the cluster member receiver 306.

The cluster head 302 may respond by transmitting a control indicator 310. The control indicator 310 may identify allocated resources. The control indicator 310 may be broadcast by the cluster head 302 such that the control indicator 310 is received by both the cluster member transmitter 304 and the cluster member receiver 306. In some embodiments, the control indicator 310 may include a cluster number temporary identification (CNTI) assignment to the cluster member transmitter 304 and/or a CNTI assignment to the cluster member receiver 306. Alternately or additionally, the cluster head 302 may transmit a D2D unicast radio-network temporary identifier (D2D-U-RNTI) associated with the unicast session between the cluster member transmitter 304 and the cluster member receiver 306.

In some embodiments, the allocated resources may include physical resources, a resource period, and/or a resource duration. The physical resources may include terminal-to-terminal data transmission resources and terminal-to-terminal feedback resources. The terminal-to-terminal feedback resources may be implicitly identified relative to the terminal-to-terminal data transmission resources.

The terminal-to-terminal data transmission resources may be used by the cluster member transmitter 304 to transmit terminal-to-terminal data transmissions 311 to the cluster member receiver 306.

The terminal-to-terminal feedback resources may be used by the cluster member receiver 306 to transmit acknowledgements 312 in response to the terminal-to-terminal data transmissions 311. The acknowledgements 312 may include a positive acknowledgement (ACK) configured to indicate that the terminal-to-terminal data transmissions 311 were successfully received by the cluster member receiver 306. Alternately or additionally, the acknowledgements 312 may include a negative acknowledgement (NACK) configured to indicate that the terminal-to-terminal data transmissions 311 were not successfully received.

In some embodiments, the terminal-to-terminal data transmissions 311 and/or the acknowledgements 312 may be based on a hybrid automatic repeat-request (HARQ) scheme associated with the LTE radio access network. The cluster member transmitter 304 and the cluster member receiver 306 may maintain a HARQ process autonomously.

The cluster member transmitter 304 may transmit the terminal-to-terminal data transmissions 311 according to the allocated resources. The cluster member receiver 306 may also transmit the acknowledgements 312 according to the allocated resources.

The cluster member transmitter 304 may optionally retransmit one or more of the terminal-to-terminal data transmissions 311 with a different modulation and coding scheme (MCS) based on the acknowledgements 312 received.

In some embodiments, the communication process 300 may include cluster-member-to-cluster-head feedback. The allocated resources may include cluster-member-to-cluster-head feedback resources. The cluster-member-to-cluster-head feedback resources may include periodic resources.

The cluster member transmitter 304 may transmit feedback 313 including a transmission status of the terminal-to-terminal data transmissions 311 to the cluster head 302 via the cluster-member-to-cluster-head feedback resources. The transmission status may include a terminal-to-terminal data transmission queue status, information about the transmission quality of the terminal-to-terminal data transmissions 311, a transmission power of the terminal-to-terminal data transmissions 311, or the like or any combination thereof. The information about the quality of the terminal-to-terminal data transmissions 311 may include statistics related to the ACKs and NACKs received via the acknowledgements 312.

The cluster member receiver 306 may also transmit feedback 314 including a reception status of the terminal-to-terminal data transmissions 311 to the cluster head 302 via the cluster-member-to-cluster-head feedback resources. The reception status may include information about the transmission quality of the terminal-to-terminal data transmissions 311, a signal-to-interference-and-noise-ratio (SINR), or the like or any combination thereof. The information about the quality of the terminal-to-terminal data transmissions 311 may include statistics related to the ACKs and NACKs transmitted via the acknowledgements 312.

In some embodiments, the cluster head 302 may transmit a control indicator 315. The control indicator 315 may identify updated allocated resources generally corresponding to the allocated resources used to communicate the terminal-to-terminal data transmissions 311 and the acknowledgements 312. The updated allocated resources may be changed from the allocated resources based on the feedback 313, the feedback 314, available terminal-to-terminal communication resources, demand for the available terminal-to-terminal communication resources, or the like or any combination thereof. The control indicator 315 may be broadcast by the cluster head 302 such that the control indicator 315 is received by the cluster member transmitter 304 and the cluster member receiver 306.

Alternately or additionally, the control indicator 315 may instruct the cluster member transmitter 304 to adjust the transmission power of transmissions to the cluster member receiver 306.

In response to receiving the control indicator 315, the cluster member transmitter 304 may transmit terminal-to-terminal data transmissions 316 via the updated allocated resources. The terminal-to-terminal data transmissions 316 may generally correspond to the terminal-to-terminal data transmissions 311.

In response to the terminal-to-terminal data transmissions 316, the cluster member receiver 306 may transmit acknowledgements 317 via the updated allocated resources. The acknowledgements 317 may generally correspond to the acknowledgements 312.

In some embodiments, the process of updating the allocated resources may continue until the cluster member transmitter 304 has successfully transmitted the data transmissions associated with the unicast session.

In some embodiments, the cluster member transmitter 304 may transmit feedback 318 generally corresponding to the feedback 313. The cluster member receiver 306 may also transmit feedback 319 generally corresponding to the feedback 314.

In some embodiments, the cluster head 302 may transmit a control indicator 320 including a termination signal. The control indicator 320 may be received by the cluster member transmitter 304 and the cluster member receiver 306. The termination signal of the control indicator 320 may inform the cluster member transmitter 304 and the cluster member receiver 306 that the allocated resources and/or the updated allocated resources are no longer allocated for a terminal-to-terminal unicast from the cluster member transmitter 304 to the cluster member receiver 306. The termination signal may be included in the control indicator 320 based on the feedbacks 318 and 319. The termination signal may be transmitted after the cluster member transmitter 304 has no more data transmissions to transmit to the cluster member receiver 306, if the terminal-to-terminal data transmissions 316 are not being received successfully by the cluster member receiver 306, or the like.

In some embodiments, the termination signal may not be used to end the example communication process 300. For example, the example communication process 300 may end after the duration of the allocated resources and/or the updated allocated resources are reached.

Figure 4A:
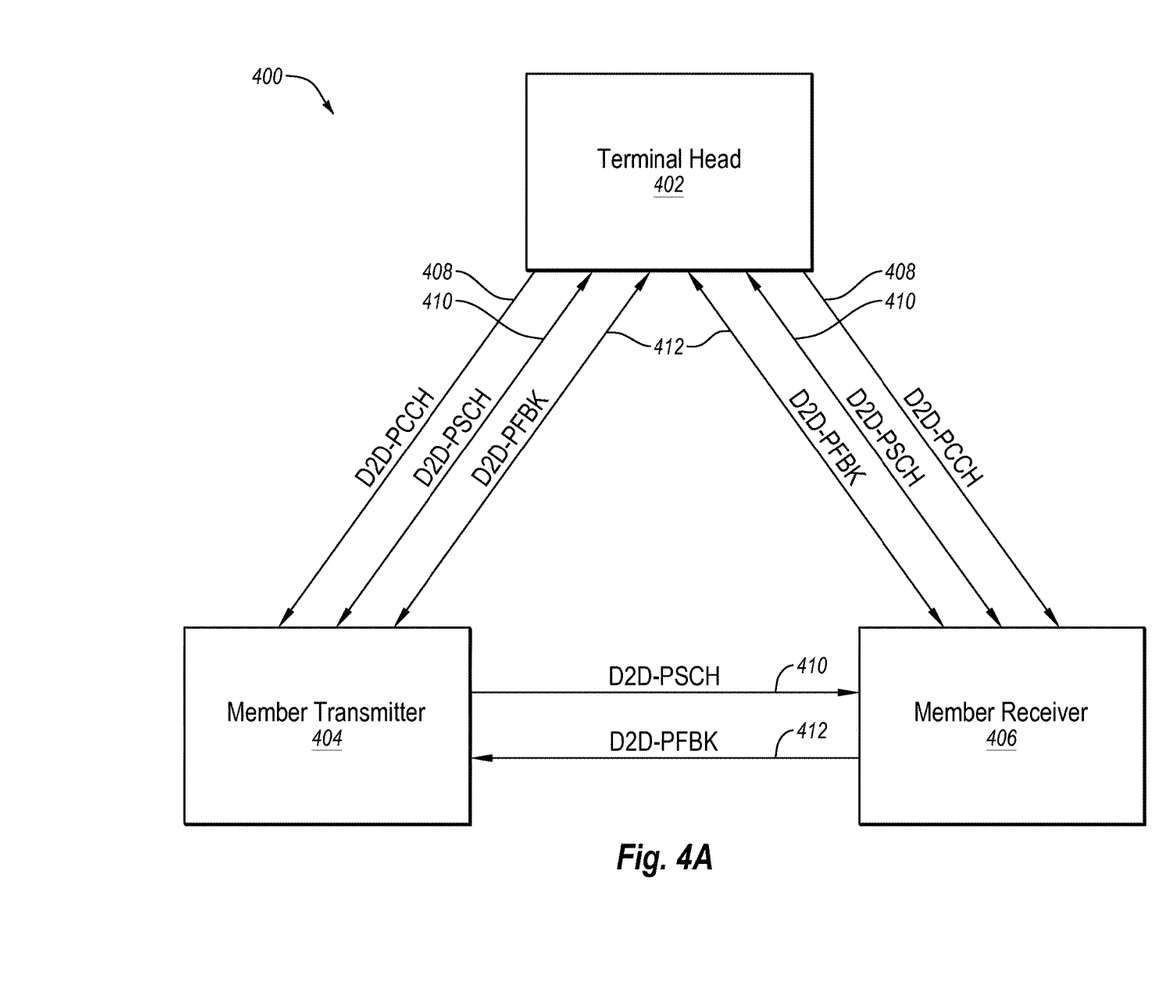
FIG. 4A is a diagrammatic view of an example channel scheme between a terminal cluster head, a cluster member transmitter, and a cluster member receiver that may be implemented in the cluster of FIG. 2.

FIG. 4A is a diagrammatic view of an example channel scheme 400 between a terminal cluster head 402, a cluster member transmitter 404, and a cluster member receiver 406 that may be implemented in the cluster 200 of FIG. 2. The terminal cluster head 402 may generally correspond to the terminal 104a of FIG. 1, the cluster head 202 of FIG. 2, and/or the cluster head 302 of FIG. 3. The cluster member transmitter 404 may generally correspond to the terminal 104b of FIG. 1, the cluster member 206a of FIG. 2 and/or the cluster member transmitter 304 of FIG. 3. The cluster member receiver 406 may generally correspond to the terminal 104c of FIG. 1, the cluster member 206b of FIG. 2, and/or the cluster member receiver 306 of FIG. 3.

In some embodiments, the channel scheme 400 may be employed in an LTE radio access network. The channel scheme 400 may optionally be employed in performing the communication process 300 of FIG. 3.

The channel scheme 400 may include a D2D physical control channel (D2D-PCCH) 408. In some embodiments, the terminal cluster head 402 may transmit the control indicators 310, 315, and 320 of FIG. 3 via the D2D-PCCH 408. The cluster member transmitter 304 and the cluster member receiver 306 of FIG. 3 may monitor the D2D-PCCH 408 for the control indicators 310, 315, and 320. Other control signals may alternately or additionally be transmitted via the D2D-PCCH 408.

The channel scheme 400 may further include a D2D physical shared channel (D2D-PSCH) 410. The terminal cluster head 402 may allocate D2D-PSCH 410 resources for use by the cluster member transmitter 404 and/or the cluster member receiver 406 to transmit the terminal data transmissions 311 and 316, and/or the feedbacks 313, 314, 318, and 319 of FIG. 3.

In some embodiments, the cluster member transmitter 404 may use the D2D-PSCH 410 to transmit the request for resources 308 of FIG. 3. Resources for transmitting the request for resources 308 may be allocated via an in-cluster random access, a periodic allocation, or the like.

The channel scheme 400 may further include a D2D physical feedback channel (D2D-PFBK) 412. The terminal cluster head 402 may allocate D2D-PFBK 412 resources for use by the cluster member transmitter 404 and/or the cluster member receiver 406 to transmit the acknowledgements 312 and 317, and/or the feedbacks 313, 314, 318, and 319 of FIG. 3.

Alternately or additionally, the terminal cluster head 402 may transmit the control indicators 310, 315, and 320 via the D2D-PSCH 410 and/or the D2D-PFBK 412. For example, the terminal cluster head 402 may transmit the control indicator 310 and the control indicators 310, 315, and 320 using an SPS scheme via the D2D-PSCH.

In these and other embodiments, additional logic channels and/or transport channels may be used. For example, logic channels such as a D2D logic control channel (D2D-LCCH) and a D2D dedicated traffic channel (D2D-DTCH) may be used to carry terminal-to-terminal control traffic and dedicated terminal-to-terminal traffic, respectively. A transport channel such as a D2D shared channel (D2D-SCH) may be dedicated for D2D data traffic.

Figure 4B:
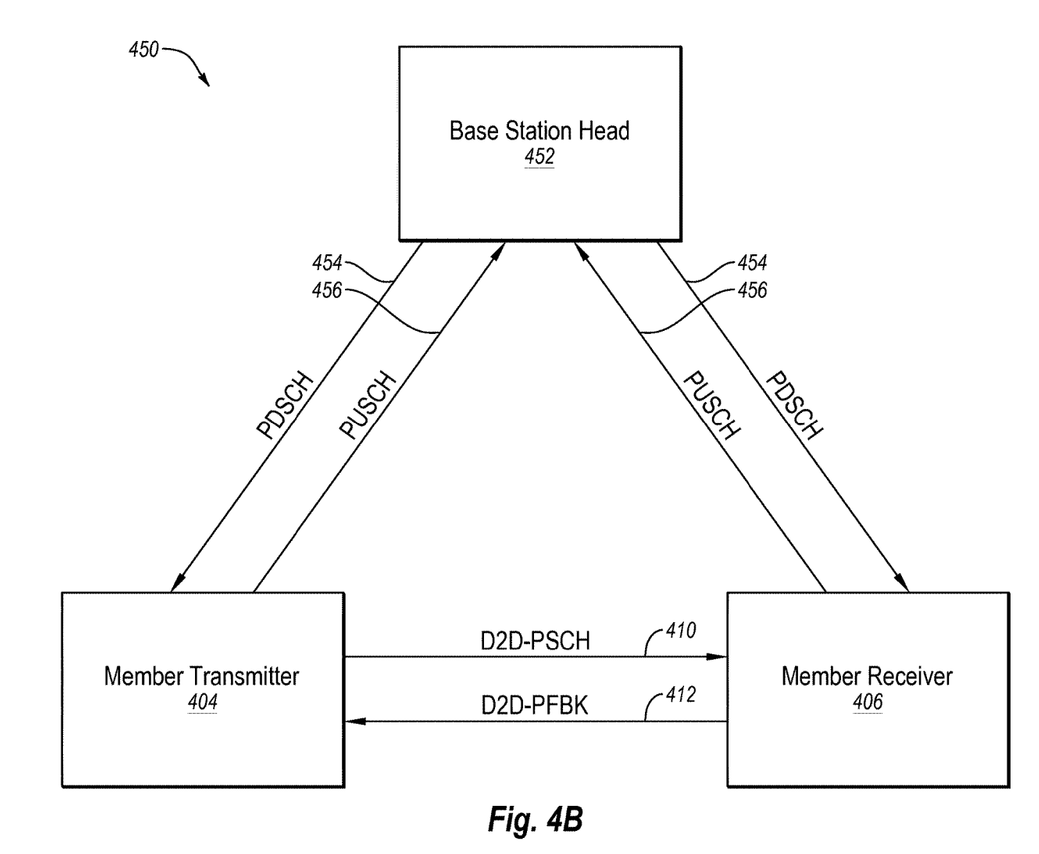
FIG. 4B is a diagrammatic view of an example channel scheme between a base station cluster head, a cluster member transmitter, and a cluster member receiver that may be implemented in the cluster of FIG. 2.

FIG. 4B is a diagrammatic view of an example channel scheme 450 between a base station cluster head 452, the cluster member transmitter 404, and the cluster member receiver 406 that may be implemented in the cluster 200 of FIG. 2. The channel scheme 450 includes some elements that are similar or identical to elements of the channel scheme 400 of FIG. 4A, such as the cluster member transmitter 404, the cluster member receiver 406, the D2D-PSCH 410, and the D2D-PFBK 412, for which a more detailed description is already provided above.

The base station cluster head 452 may generally correspond to the base station 102 of FIG. 1, the cluster head 202 of FIG. 2, and/or the cluster head 302 of FIG. 3. In some embodiments, the channel scheme 450 may be employed in an LTE radio access network. The channel scheme 450 may be employed in performing the communication process 300 of FIG. 3.

The channel scheme 450 may include a physical downlink shared channel (PDSCH) 454 associated with LTE radio access networks. In some embodiments, the base station cluster head 452 may transmit the control indicators 310, 315, and 320 of FIG. 3 via the PDSCH 454. Other control signals may alternately or additionally be transmitted via the PDSCH 454.

The channel scheme 450 may alternately or additionally include a physical uplink shared channel (PUSCH) 456 associated with LTE radio access networks. In some embodiments, the cluster member transmitter 404 may use the PUSCH 454 to transmit the request for resources 308 of FIG. 3. The cluster member transmitter 404 and/or the cluster member receiver 406 may use the PUSCH 454 to transmit the feedbacks 313, 314, 318, and 319 of FIG. 3.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of enabling terminal-to-terminal communication, the method comprising:
    organizing a cluster including a cluster head, a first cluster member including a first terminal, and a second cluster member including a second terminal, the cluster head being connected to the first cluster member and the second cluster member; and
    controlling a unicast communication from the first cluster member to the second cluster member via the cluster head, including:
        receiving, at the cluster head from the first cluster member, a request for resources for a terminal-to-terminal data transmission from the first cluster member to the second cluster member;
        transmitting, from the cluster head to the first cluster member and the second cluster member, a control indicator configured to identify allocated resources for the terminal-to-terminal data transmission, the allocated resources including:
            terminal-to-terminal data transmission resources for data transmissions from the first cluster member to the second cluster member, and
            terminal-to-terminal feedback resources for acknowledgement transmissions from the second cluster member to the first cluster member; and
        receiving, at the cluster head via cluster-member-to-cluster-head feedback resources, feedback including:
            a transmission status of the terminal-to-terminal data transmission, including a terminal-to-terminal data transmission queue status of the first cluster member for the data transmissions from the first cluster member to the second cluster member, and
            a reception status of the terminal-to-terminal data transmission.

2. The method of claim 1, wherein the cluster head includes a base station and transmitting the control indicator includes transmitting the control indicator via a physical downlink shared channel (PDSCH).

3. The method of claim 1, wherein the cluster head includes a third terminal and transmitting the control indicator includes transmitting the control indicator via a device-to-device physical shared channel (D2D-PSCH).

4. The method of claim 1, further comprising transmitting a device-to-device unicast radio-network temporary identifier (D2D-U-RNTI) to the first cluster member and the second cluster member, the D2D-U-RNTI associated with the terminal-to-terminal data transmission.

5. The method of claim 1, wherein the allocated resources further include:
    a resource period; and
    a resource duration.

6. The method of claim 5, wherein the terminal-to-terminal feedback resources include device-to-device physical feedback channel (D2D-PFBK) resources.

7. The method of claim 1, wherein the allocated resources are allocated via semi-persistent scheduling.

8. The method of claim 1, wherein controlling the unicast communication from the first cluster member to the second cluster member via the cluster head further includes transmitting a power control command to at least one of the first cluster member and the second cluster member such that the first cluster member and the second cluster member experience a bidirectional link.

9. The method of claim 1, wherein controlling the unicast communication from the first cluster member to the second cluster member via the cluster head further includes transmitting a second identification of updated allocated resources.

10. The method of claim 9, wherein controlling the unicast communication from the first cluster member to the second cluster member via the cluster head further includes receiving a second feedback including a second transmission status of the terminal-to-terminal data transmission via the updated allocated resources.

11. The method of claim 10, wherein controlling the unicast communication from the first cluster member to the second cluster member via the cluster head further includes transmitting a termination signal.

12. A method of enabling terminal-to-terminal communication, the method comprising:
    organizing a cluster including a cluster head, a first cluster member including a first terminal, and a second cluster member including a second terminal, the cluster head being connected to the first cluster member and the second cluster member; and
    controlling a unicast communication from the first cluster member to the second cluster member via the cluster head, including:
        transmitting, from the cluster head to the first cluster member and the second cluster member, a control indicator configured to identify allocated resources for a terminal-to-terminal data transmission, the allocated resources including terminal-to-terminal feedback resources for acknowledgement transmissions from the second cluster member to the first cluster member; and
        receiving, at the cluster head via cluster-member-to-cluster-head feedback resources, feedback including a transmission status of the terminal-to-terminal data transmission, including a terminal-to-terminal data transmission queue status of the first cluster member for the terminal-to-terminal data transmissions from the first cluster member to the second cluster member.

13. The method of claim 12, wherein controlling the unicast communication from the first cluster member to the second cluster member via the cluster head includes:
   receiving, at the cluster head from the first cluster member, a request for resources for a terminal-to-terminal data transmission from the first cluster member to the second cluster member; and
   wherein the feedback further includes a reception status of the terminal-to-terminal data transmission.

14. The method of claim 12, wherein the cluster head includes a base station and transmitting the control indicator includes transmitting the control indicator via a physical downlink shared channel (PDSCH).

15. The method of claim 12, wherein the cluster head includes a third terminal and transmitting the control indicator includes transmitting the control indicator via a device-to-device physical shared channel (D2D-PSCH).

16. The method of claim 12, further comprising transmitting a device-to-device unicast radio-network temporary identifier (D2D-U-RNTI) to the first cluster member and the second cluster member, the D2D-U-RNTI associated with the terminal-to-terminal data transmission.

17. The method of claim 12, wherein the allocated resources further include:
   a resource period; and
   a resource duration.

18. The method of claim 12, wherein the allocated resources are allocated via semi-persistent scheduling.

19. The method of claim 12, wherein controlling the unicast communication from the first cluster member to the second cluster member via the cluster head further includes transmitting a power control command to at least one of the first cluster member and the second cluster member such that the first cluster member and the second cluster member experience a bidirectional link.

20. The method of claim 12, wherein controlling the unicast communication from the first cluster member to the second cluster member via the cluster head further includes:
   transmitting a second identification of updated allocated resources;
   receiving a second feedback including a second transmission status of the terminal-to-terminal data transmission via the updated allocated resources; and
   transmitting a termination signal.

* * * * *